United States Patent
Sames

(10) Patent No.: US 7,942,728 B2
(45) Date of Patent: May 17, 2011

(54) TRANSPORT APPARATUS FOR TRANSPORTING ARTICLES HANGING ON LOOPS

(75) Inventor: Jörg Sames, Alten Büseck (DE)

(73) Assignee: Poly-Clip Systems GmbH & Co. KG, Frankfurt (DE)

(*) Notice: Subject to any disclaimer, the term of this patent is extended or adjusted under 35 U.S.C. 154(b) by 0 days.

(21) Appl. No.: 10/892,391

(22) Filed: Jul. 15, 2004

(65) Prior Publication Data

US 2005/0042979 A1    Feb. 24, 2005

(30) Foreign Application Priority Data

Jul. 16, 2003 (DE) .................................. 103 32 329

(51) Int. Cl.
A22C 15/00 (2006.01)

(52) U.S. Cl. ........... 452/51; 452/177; 452/178; 452/180

(58) Field of Classification Search ............... 452/46, 452/47, 48, 49, 50, 51, 177, 178, 179, 180, 452/181, 183
See application file for complete search history.

(56) References Cited

U.S. PATENT DOCUMENTS

| | | | | |
|---|---|---|---|---|
| 902,530 | A * | 10/1908 | Gustavsen | 198/666 |
| 2,620,917 | A * | 12/1952 | Dahlberg | 198/659 |
| 2,987,170 | A | 6/1961 | Hamilton | |
| 3,083,816 | A | 4/1963 | Ellis | |
| 3,178,012 | A * | 4/1965 | Weiss et al. | 198/659 |
| 3,590,985 | A * | 7/1971 | Hirsch | 198/659 |
| 3,644,085 | A * | 2/1972 | Beeley et al. | 8/150 |
| 3,770,148 | A * | 11/1973 | Hendren | 414/287 |
| 4,014,431 | A * | 3/1977 | Angeletti et al. | 198/660 |
| 4,091,505 | A * | 5/1978 | Muller et al. | 452/47 |
| 4,547,931 | A * | 10/1985 | Staudenrausch et al. | 452/51 |
| 4,682,385 | A * | 7/1987 | Kasai et al. | 452/51 |
| 4,880,105 | A * | 11/1989 | Kasai et al. | 198/465.4 |
| 4,993,539 | A * | 2/1991 | Duce | 198/659 |
| 5,073,142 | A * | 12/1991 | Kasai et al. | 452/51 |
| 6,213,368 | B1 * | 4/2001 | Vermeer et al. | 226/104 |
| 2005/0006202 | A1 | 1/2005 | Beyer | |

FOREIGN PATENT DOCUMENTS

| | | | |
|---|---|---|---|
| DE | 1 214 611 | * | 4/1966 |
| DE | 3806467 | * | 5/1989 |
| DE | 42 05 456 A1 | * | 8/1993 |
| DE | 42 44 220 A1 | * | 6/1994 |
| DE | 101 52 926 A1 | | 5/2003 |
| EP | 0377090 | * | 7/1990 |
| EP | 0727144 | * | 8/1996 |
| EP | 0 647 577 B1 | * | 4/1999 |
| GB | 1007510 | | 10/1965 |
| GB | 1 304 209 | | 1/1973 |
| SU | 429179 | | 10/1974 |
| SU | 1535782 A1 | | 1/1990 |
| WO | WO 95/21116 | | 8/1995 |
| WO | WO 03/022713 A1 | * | 3/2003 |

* cited by examiner

*Primary Examiner* — David J Parsley

(74) *Attorney, Agent, or Firm* — Scott M. Oldham, Esq.; Hahn Loeser + Parks LLP

(57) ABSTRACT

A transport apparatus for transporting articles hanging on loops or the like, in particular sausage-shaped packs, comprising a shaft which has a first axial portion on which a screw is disposed. A drive moment is applied by way of the outside periphery of the screw and the shaft is supported by way of the outside periphery of the screw.

19 Claims, 7 Drawing Sheets

TRANSPORT APPARATUS FOR TRANSPORTING ARTICLES HANGING ON LOOPS

This application claims the benefit of German patent application serial number 103 32 329.5-22, filed Jul. 16, 2003, and is hereby incorporated by reference.

TECHNICAL FIELD

The invention concerns a transport apparatus for transporting articles hanging on loops or the like, in particular sausage-shaped packs, comprising a shaft which has a first axial portion on which a screw thread form is disposed, and drive means and bearing means for the shaft.

BACKGROUND OF THE INVENTION

It is the usual practice in sausage production for the filling of a sausage which is to be formed to be conveyed by way of a filling tube into a tube-like or bag-like packaging material which is closed at one end. After the filling operation is concluded, a twisted braid portion which is free of filling material is formed by means of two members referred to as displacer plates. Two closure means, referred to as clips, are then applied to that braid portion, and close the packaging material on both sides of the braid portion. Thereafter that portion is severed therebetween. If the sausage is later to be hung up for example for the purposes of smoking or storage, for example a suspension loop is fed thereto in such a way that, when the clip is fitted, it is embraced by the clip and is thus secured to the sausage.

The term loops in accordance with this invention is used to denote all means, on which articles can be hung up.

Many sausage products are subsequently subjected to further processing for example in a smoking chamber. For that purpose the sausages have to be hung up individually and separately at their loops in such a way that as far as possible they do not touch each other. The degree of automation is not very far advanced in this field so that at the present time sausages are still hung on smoking rails by hand.

An exception is afforded by the apparatus which is known from DE 34 37 830 or DE 38 06 467 and by means of which the loops which are threaded on by a pick-up means are transferred by way of a pneumatically linearly driven slider onto an endless chain which circulates in a vertical plane. The sausages are transported away in a condition of hanging on those loops by the upper half of the chain. The reciprocating movement of the slider which is cyclic in respect of time, means that the sausages can be separated at uniform spacings on the chain.

When the chain is filled over a given region of its total length, a 180° pivotal movement of the chain drive about the longitudinal axis thereof is implemented, whereby a smoking rail which embraces the previously lower half of the chain is pivoted upwardly so that the loops are transferred from the previously upper half of the chain onto the smoking rail and comes to lie thereon.

A disadvantage with an apparatus of that nature however is that the configuration of the slider with means for transfer of the sausage supplied by the pick-up means onto the chain and the configuration of the pivotal mechanism for transfer of the sausage from the chain onto the smoking rail are highly complicated and expensive. There is also the disadvantage that the smoking rail is a special and thus expensive item of manufacture which at the same time serves to cover over the lower half of the chain. There is also the disadvantage that the drive for the chain is discontinuous: the chain is driven until it is completely loaded, then it is stopped, whereupon a 180° pivotal movement of the entire chain drive is effected. That requires a considerable level of mechanical expenditure and slows down the conveying process.

Another apparatus for transporting strings of a plurality of mutually attached sausages is known from DE 32 38 023. That apparatus has a conveyor belt on which the string of sausages is transported in one direction. That conveyor belt is adjoined by a transport screw which is mounted pivotably to an eccentric arm and to which the strings of sausages are transferred. That is effected by a procedure whereby the sausages fall successively downwardly due to the force of gravity at the end of the conveyor belt and due to the relative movement of the conveyor belt with respect to the transport screw are suspended thereover transversely to the direction of rotation of the screw. In addition at the end of the transport screw, by virtue of the sweeping eccentric movement thereof, the strings of sausages can only be transferred by a dropping movement onto a linearly synchronously extendable smoking rail.

Both transfer processes are not possible however when dealing with closed loops on which individual sausages or strings of sausages are hung. In addition, an increase level of mechanical complication and expenditure is required for that purpose in each case as the various movements of the conveyor belt, the transport screw and the smoking rail have to be synchronized. Finally, the operation of depositing the string of sausages on the smoking rail is not very precise.

SUMMARY OF THE INVENTION

Therefore the object of the invention is to provide a transport apparatus of the kind set forth in the opening part of this specification, which is simple in terms of its design configuration and which guarantees reliable and damage-free transport of the articles.

That object is attained by a transport apparatus of the kind set forth in the opening part of this specification, in which the drive means and the bearing means are so arranged that a drive moment is applied by way of the outside periphery of the screw and the shaft is supported by way of the outside periphery of the screw.

In that way it is possible that an article which is suspended even on a closed loop or the like can be transported in a condition of hanging on the core of the screw over the entire length thereof and can be transferred coaxially at the beginning and the end thereof, as no drive or bearing mechanism which engages the transport periphery of the shaft from the outside—such as for example the eccentric arm known from DE 32 38 023—impedes transport of the loop. In that respect transport is effected insofar as the loop is positively conveyed in one direction by the flanks of the screw by virtue of the rotary movement of the latter. In contrast the drive moment is applied by way of the outside periphery of the screw, that is to say without coming into contact with the loops or the like or blocking off the path of transport movement thereof. The same correspondingly applies for the shaft bearing arrangement.

The shape, depth or width of the passages between two adjacent turns of the screw, the shape of the flanks of the screw, the ratio of the shaft outside diameter to the outside diameter of the screw or the pitch of the screw are not matters of primary importance in the transport apparatus according to the invention. It is thus possible to select for example the form of a conveyor screw with a shaft and a plate welded thereto in a helical configuration, or that of a for example trapezoidal screw thread which is formed integrally on the shaft.

In an advantageous configuration, the drive means include a drive roller with an external peripheral contact surface for frictional application of the drive moment. That has the advantage that the drive roller bears with its contact surface permanently against the outside periphery of the screw and thus at the same time provides for guidance for the screw.

Alternatively the drive means may also include a drive pinion and the outside periphery of the screw may have at least one axial portion with a peripheral tooth arrangement which in positively locking engagement with the drive pinion. That has the advantage that the drive does not cause any slip worth mentioning. On the other hand that drive is noisier and does not afford the advantage of guiding the shaft.

In a further embodiment, the transport apparatus has two bearing rollers which are so arranged that the shaft is supported by way of the outside periphery of the screw on the peripheral surface of the bearing rollers.

That arrangement ensures that the shaft is supported in a way which also does not represent any hindrance for transportation of the loops on the core of the shaft. It will be noted that it is only one of several alternatives. It is possible for example, so-to-speak, for the shaft to be supported at the outside periphery of the screw in a for example two-part plain bearing. Then, centrally beneath the shaft, the plain bearing would have a gap for the loop moving on the core of the shaft to pass therethrough. That embodiment however suffers from the disadvantage of involving an increased amount of wear and increased noise, in comparison with the roller bearing arrangement. It is also possible to provide more than a total of three rollers. In principle the bearing rollers together with the drive roller can involve any arrangement around the shaft. Preferably however the intermediate angle between two peripherally adjacent rollers is less than 180° so that the shaft is radially securely fixed. It is also advantageous for the bearing rollers to be arranged symmetrically beneath the shaft and the central axis of the drive roller centrally above the shaft.

In a further advantageous configuration, the shaft has a second portion with an overridable positive guide means for the loop or the like. That can preferably be achieved if there is a spiral notch around the periphery of the shaft, with flanks which terminate at an obtuse angle with respect to the surface of the shaft, in the axial direction.

If a sausage which is hanging on a loop is transported in such a notch in the axial direction by virtue of rotation of the shaft and if in that situation that sausage encounters an obstacle, the loop can relatively easily slide out of the notch, over the flank thereof. In that way sausages for example can firstly be collected on the second portion of the shaft in order for example to synchronize the cyclic procedure at the feed end, which is governed by the mode of manufacture, when taking over the sausages, with the cyclic procedure governed by a removal apparatus, upon delivery of the sausages. In addition it is possible in that way to set given spacings between two successive sausages (pitch spacing). A given pitch spacing can be set additionally or separately by means of a preselected speed of rotation and/or by a preselected screw pitch of the spiral notch.

Alternatively the overridable positive guide means can also be implemented in such a way that the shaft has a substantially smooth surface and is inclined with respect to the horizontal in the transport direction of the transport apparatus. Transport is then ensured by virtue of the fact that the loops slide along the shaft by virtue of the force of gravity and due to the rotation of the shaft.

The sausages are preferably collected by at least one stopper which is reciprocatable in the region of the second portion of the shaft between a first position in which it engages into the path of transport movement of the transport apparatus and a second position in which it clears the transport path. Instead of the stopper it is possible to provide two or more cyclically controlled stoppers which engage alternately into the transport path and thus individually separate the sausages transported thereto.

BRIEF DESCRIPTION OF THE DRAWINGS

Further objects, features and advantages of the invention will now be described in greater detail by means of embodiments with reference to the drawings in which.

DETAILED DESCRIPTION OF THE INVENTION

Figure 1:
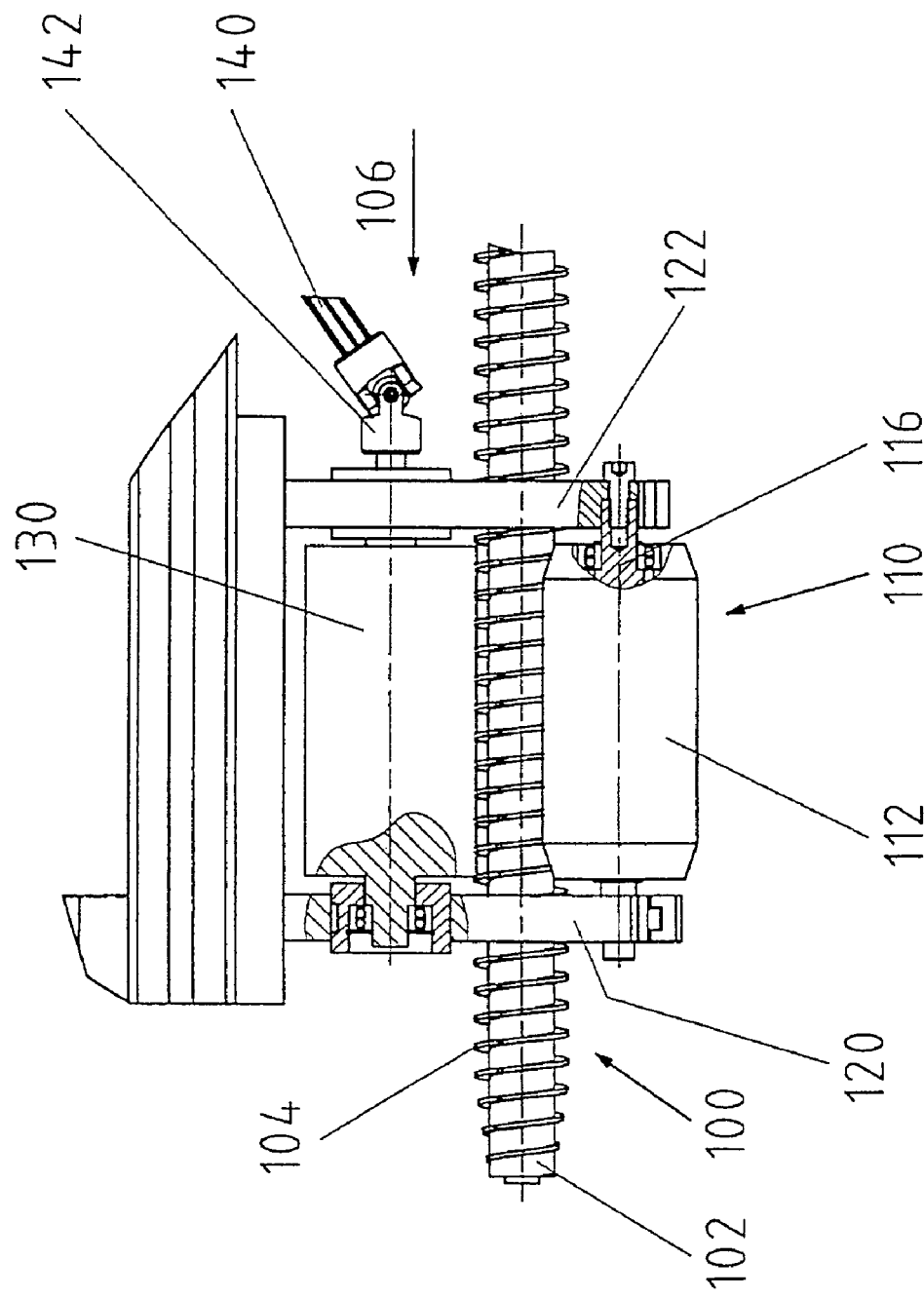
FIG. 1 shows a side view of a first portion of the shaft and a drive and bearing roller arrangement in accordance with a first embodiment of the transport apparatus according to the invention.
Figure 2:
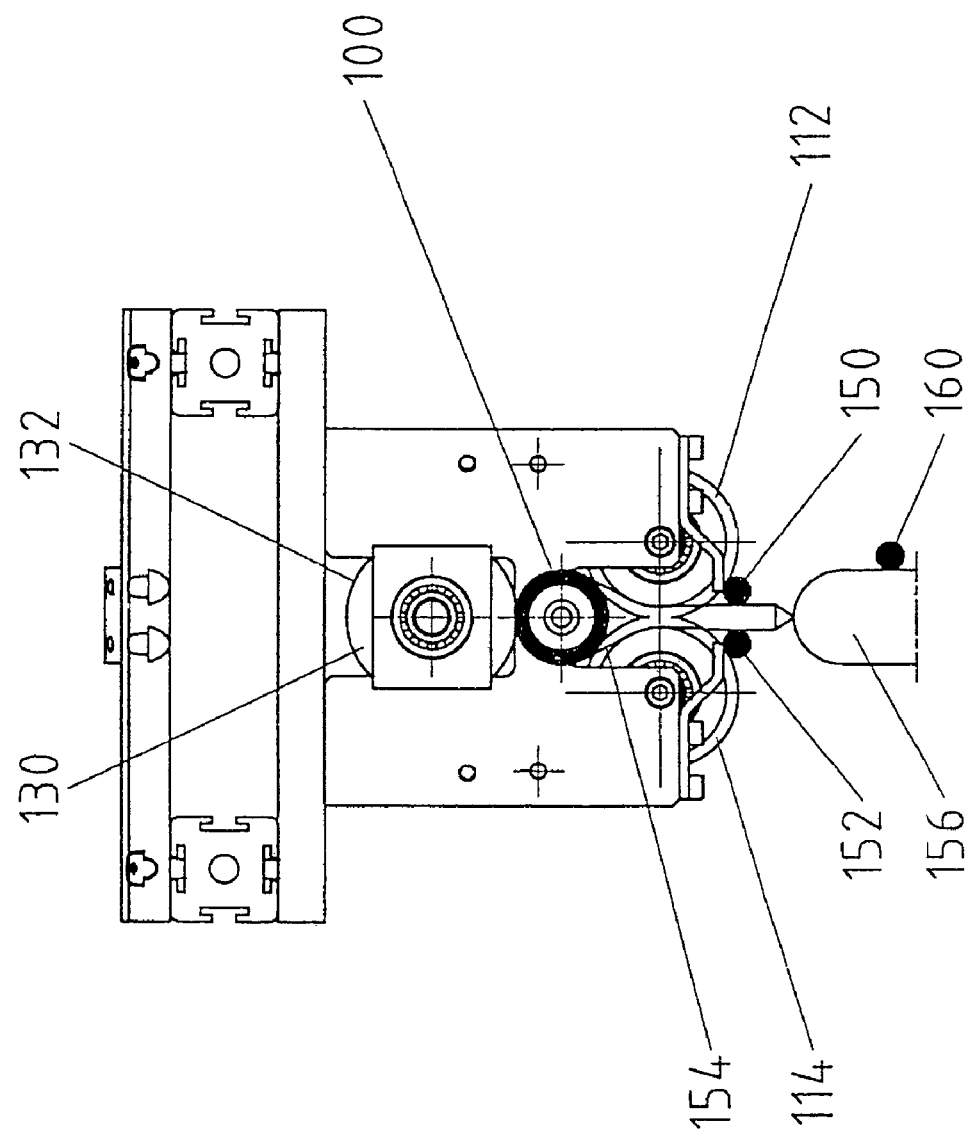
FIG. 2 shows a front view of the arrangement shown in FIG. 1.

The embodiment of a transport apparatus according to the invention, as is illustrated in FIGS. 1 and 2, has a shaft 100, on the core 102 of which is mounted a screw 104, for example by welding on a metal plate wound around the core. In this embodiment the screw forms a right-hand screwthread which ends at the left-hand end of the shaft. That end may be adjoined for example by a second portion, as is described hereinafter with reference to FIG. 3.

The shaft 100 is supported by way of the outside periphery of the screw 104 on two bearing rollers 112, 114 forming the bearing means 110. The bearing rollers are arranged in mirror image relationship with the plane extending perpendicularly through the central axis of the shaft 100 so that the shaft is supported with equal weight on both bearing rollers 112, 114. In addition the two bearing rollers form a gap which is arranged in that plane, through which the loop hanging on the core 102 is guided out downwardly between the bearing rollers 112, 114. The two bearing rollers 112, 114 are in turn mounted on a respective spindle 116 by means of ball bearing assemblies. The spindles 116 are fixed to two vertical bearing holders 120, 122 arranged perpendicularly to the transport direction identified by an arrow 106. A drive roller 130 arranged above the shaft 100 is also mounted on the bearing holders 120, 122. It bears with a contact surface 132 formed by its outside periphery against the outside periphery of the screw 104 and thus forms a frictional connection thereto. Frictional engagement is preferably increased by the contact surface 132 being rubber-covered. The drive roller 130 together with the bearing rollers 112, 114 forms a star-shaped arrangement around the central axis of the shaft 100 in such a way that, starting therefrom, the central axes of the drive roller and the bearing rollers respectively each include an angle which is less than 180°. That provides that the shaft is securely supported and held so that it cannot jump out of the bearing configuration.

In the illustrated embodiment the drive moment is transmitted to the drive roller 130 by way of a shaft 140 and a universal joint 142. A drive motor could equally also be directly flange-mounted to the bearing holder 122.

Disposed beneath the shaft 100 in the region in front of and/or behind the bearing means 110 are two railing members 150, 152, see FIG. 2, which form a gap disposed substantially centrally below the central axis of the shaft. The loop 154 on which the sausage 156 diagrammatically shown in FIG. 2 is suspended and which is transported on the core 102 of the shaft 100 is guided through that gap. The railing members 150, 152 serve to suppress swinging movement of the sausage 156, which may possibly be caused by the rotary movement of the shaft 100. In addition, at their beginning, the railing members have an enlargement or fork configuration (not shown) so that the loops are reliably threaded therein. In addition, arranged at the height of the sausage 156 is a further railing member 160 which additionally prevents the sausage 156 from swinging or suffering from increasing oscillation.

Figure 3:
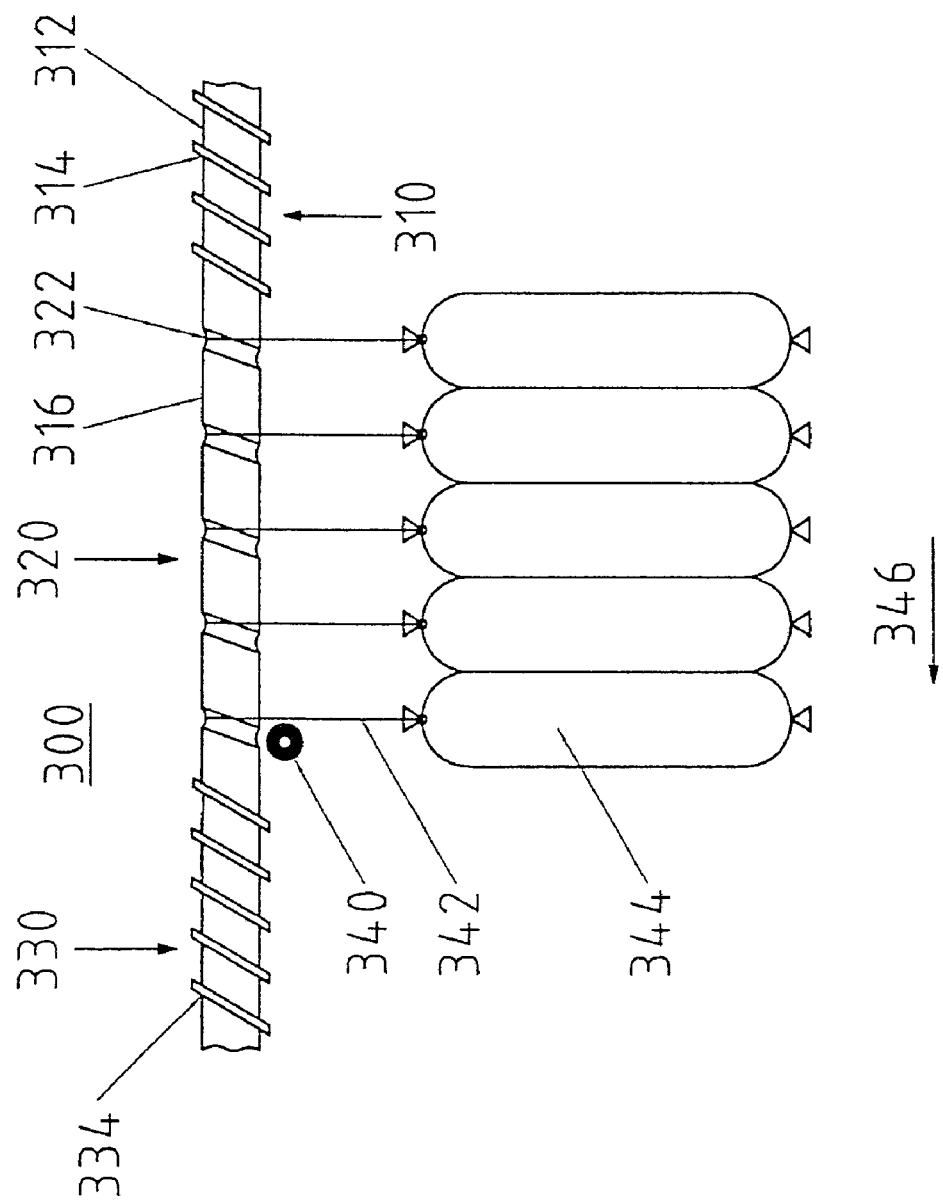
FIG. 3 shows a side view of second and third portions of the shaft in a further embodiment of the transport apparatus according to the invention.

The embodiment shown in FIG. 3 of the shaft 300 according to the invention, besides a first portion 310, on the core 312 of which a screw 314 is mounted as described hereinbefore, has a second portion 320. The second portion 320 is of substantially the same core diameter but is characterized by an overridable positive guide means which extends in the form of a spiral notch 322 around the periphery of the shaft or, more precisely, around the periphery of the shaft core 312. The notch 322 has flanks which end at an obtuse angle with respect to the shaft surface 316.

In addition the embodiment shown in FIG. 3 has a stopper 340 which engages into the transport path of the second portion 320 of the shaft 300. In that way, sausages 344 hanging on loops 342 on the shaft 300, in the second portion 320, are prevented from being further transported in the direction indicated by an arrow 346. In that portion, by virtue of the flanks ending at an obtuse angle with respect to the shaft surface 316, the loops can slip out of the spiral notch 322. That makes it possible to buffer a given number of sausages 344 without risking damaging the loops 342. That is appropriate in particular when manufacture of the sausages and thus the feed thereof takes place at a different cyclic frequency than removal of the sausages.

The embodiment of the shaft 300 which is shown in FIG. 3 also has a third portion 330 in which once again a screw 334 is disposed on the core 312. When the stopper 340 is moved out of its first position in which it engages into the transport path of the shaft 300, for example by a pneumatic piston drive, into a second position in which it clears the transport path, the sausages 344 can be further transported by the third portion 330 of the shaft 300. In addition the third portion 330 serves to support the shaft by additional bearing means in order to distribute the high flexural moment which acts on the bearings, particularly when long shafts are involved.

Figure 4:
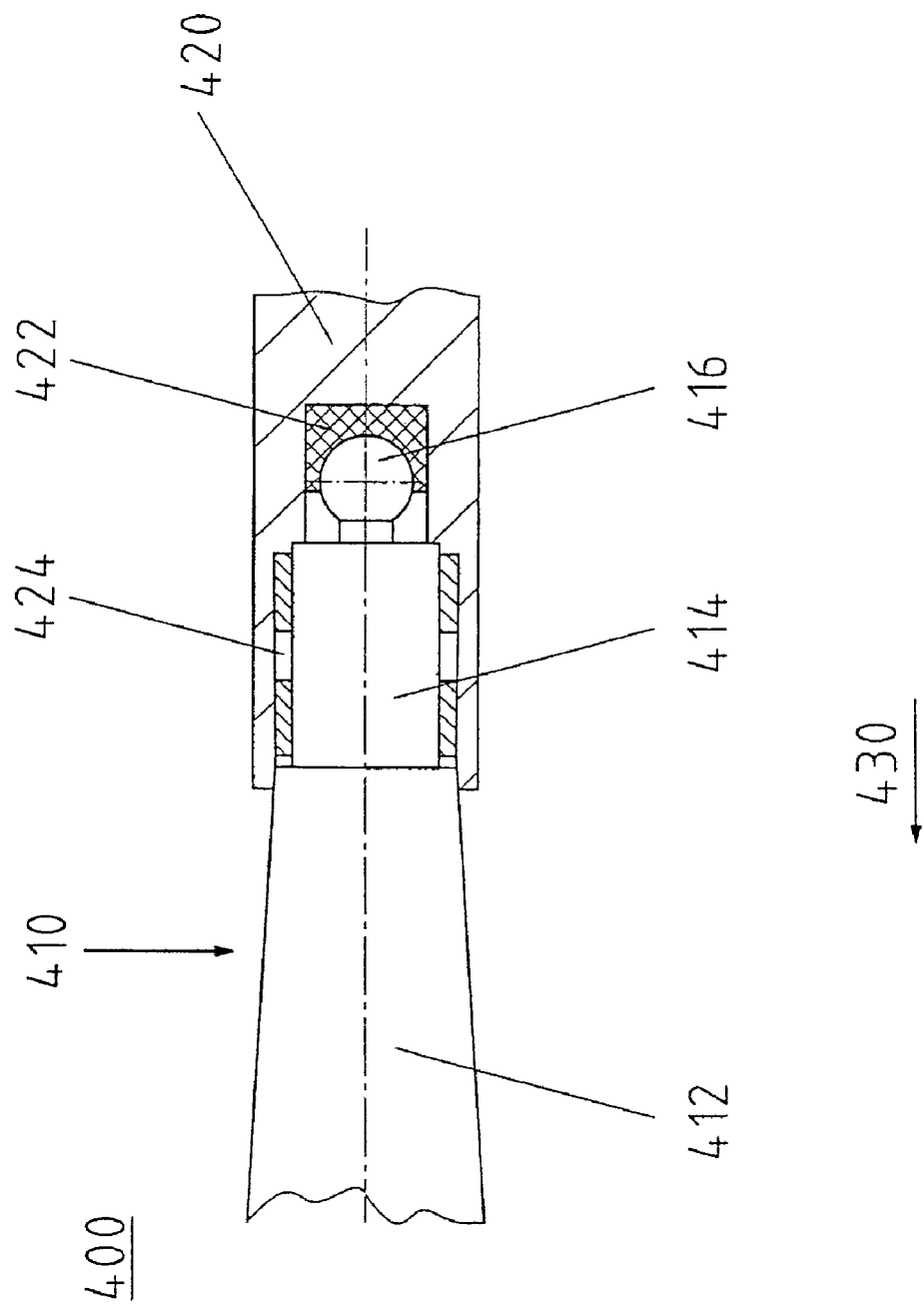
FIG. 4 shows a partly sectional view of an axial rotary bearing arrangement at the feed end of the shaft.

FIG. 4 shows the possible configuration of the feed beginning end 410 of an embodiment of the shaft 400. It has a cone portion 412 which tapers in opposite relationship to the transport direction identified by an arrow 430. The cone portion is adjoined by a cylindrical portion 414, for pivotally connecting a loop feed means 420 which is rotatable relative to the shaft 400 and which is disposed upstream of the shaft. The cylindrical portion 414 serves as a coaxial rotary bearing element and co-operates for example with one or more plain or rolling bearings 424 which are let into a portion of the loop feed means 420, said portion corresponding to the cylindrical portion of the shaft 400. At the outermost beginning portion 410, towards the feed end, of the shaft 400, a ball 416 is provided as an element for securing against axial relative movement between the shaft 400 and the upstream-disposed loop feed means 420. The ball engages into a part-elastic ball socket 422 which is let into the loop feed means 420. That arrangement thus provides both a coaxial radial rotary bearing arrangement and also an axial securing means which guarantees relative alignment of the shaft 400 with the adjoining loop feed means 420. The loop feed means 420 can also be in particular a stationary loop pick-up means which does not also rotate with the shaft 400. Other forms of rotary bearing arrangements and axial securing means can equally be provided. In particular the arrangement of the elements as between the shaft and the loop feed means can also be interchanged so that the shaft is provided with suitable bores and rotary or plain bearings let therein as a rotary bearing element and a corresponding ball socket as a securing means to prevent axial relative movement. A novel apparatus for picking up and guiding loops onto a shaft similar to that of the present invention is disclosed in co-owned U.S. patent application Ser. No. 10/892,389, filed Jul. 15, 2004, entitled Apparatus For Picking Up and Guiding Loops, which is hereby incorporated by reference.

Figure 5:
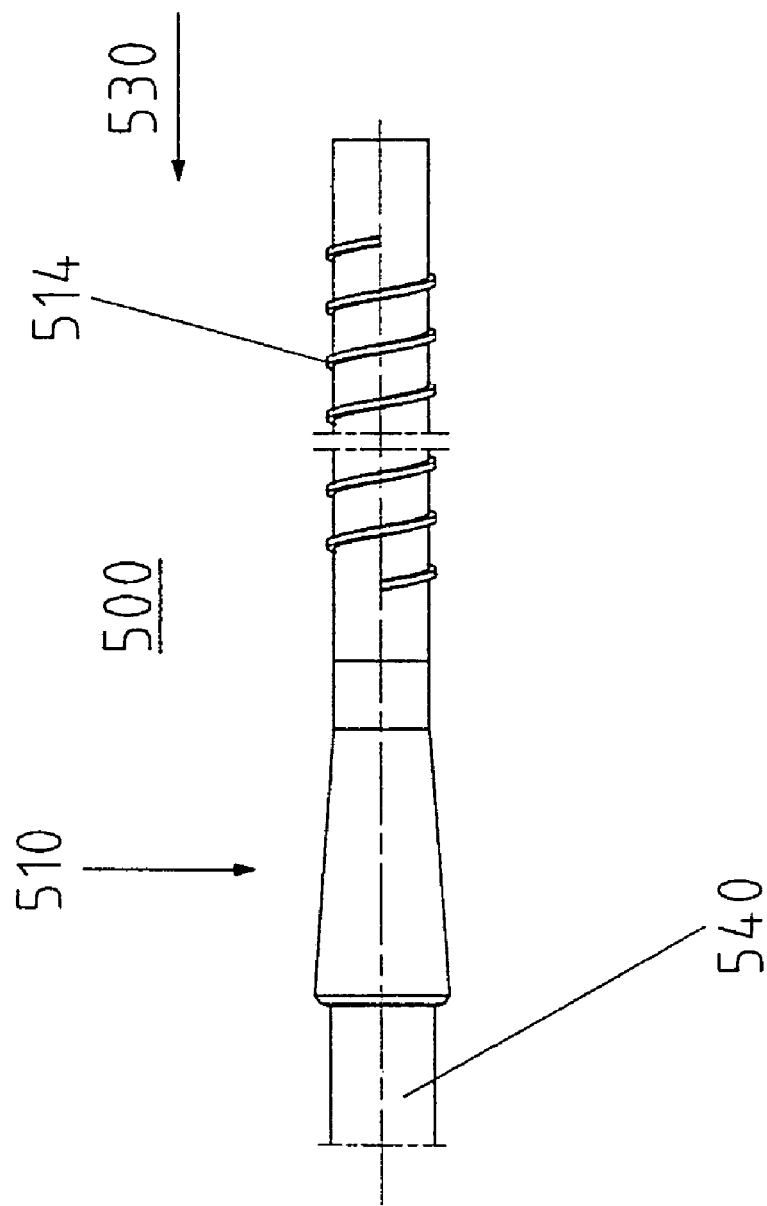
FIG. 5 shows a side view of an embodiment of the discharge end of the shaft.

FIG. 5 shows a possible configuration of the discharge end 510 of an embodiment of the shaft 500 according to the invention. It is of a cross-section which enlarges in the transport direction identified by an arrow 530 and over which the loops transported thereto by the screw 514 can slide off onto a loop removal means 540 such as for example a smoking rail which is connected downstream of the shaft 500 and which is aligned substantially coaxially therewith.

Figure 6:
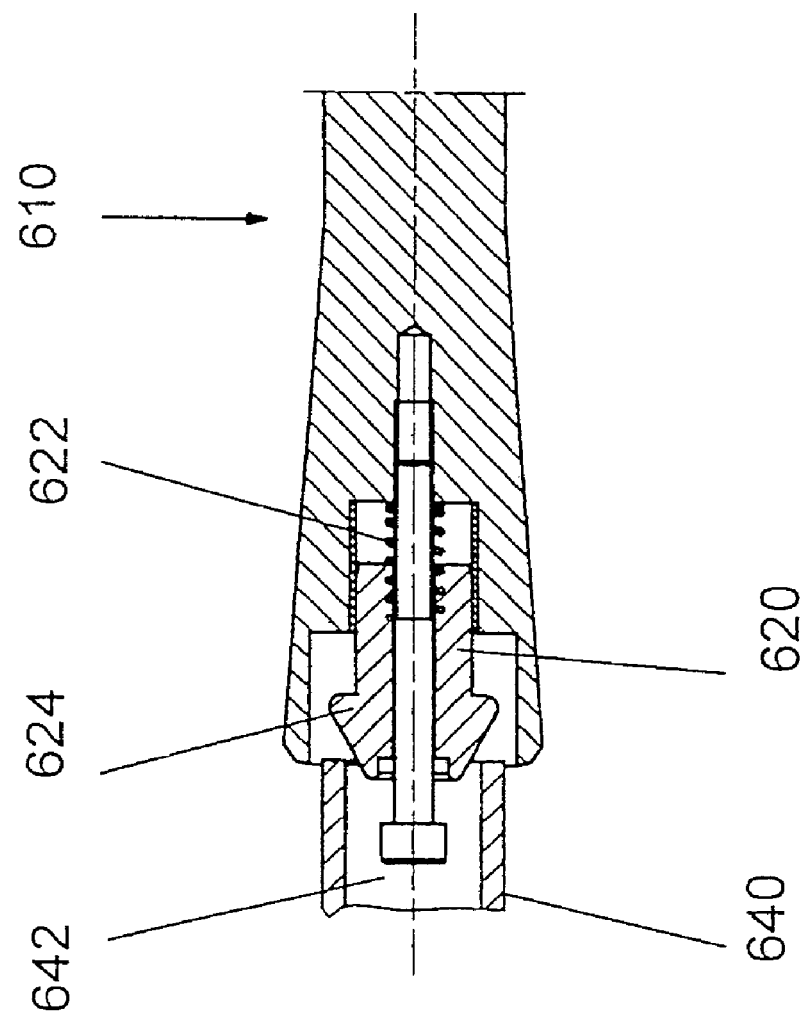
FIG. 6 shows a partly sectional view of the embodiment of the discharge end of the shaft illustrated in FIG. 5.

It will be seen from the cross-sectional view in FIG. 6 that the discharge end 610, in its interior, has an axially displaceable centering bar 620. It is biased in the axial direction by means of a spring 622 and presses with its conical centering head 624 into a central bore 642 in the downstream-disposed loop removal means 640. If for example a tubular smoking rail is used as the downstream-disposed loop removal means 640, the internal cross-section thereof forms the central bore.

Figure 7:
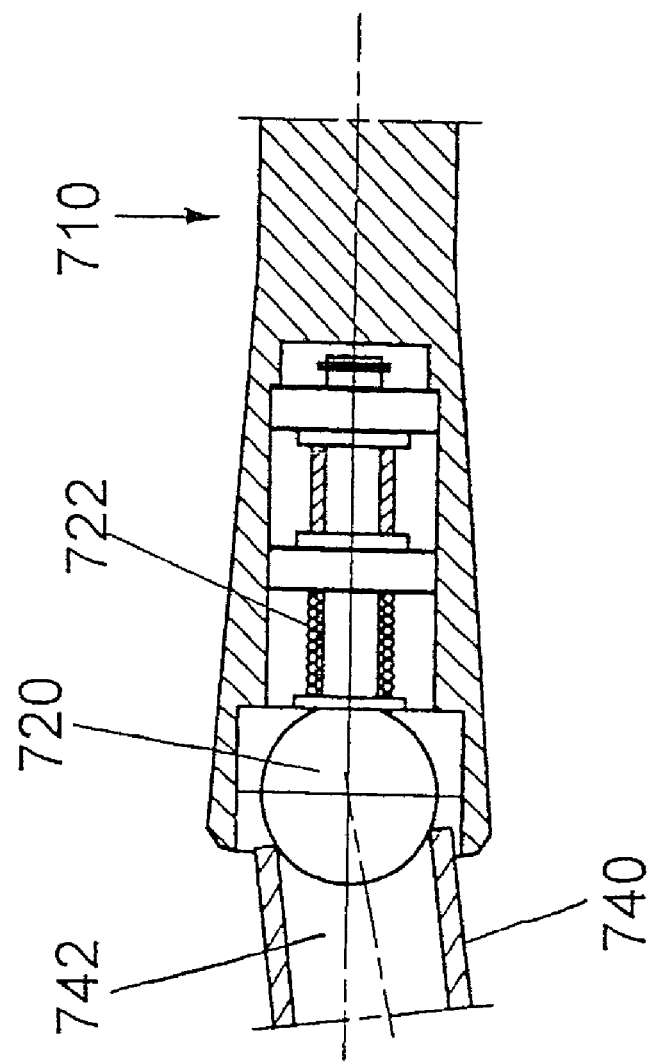
FIG. 7 shows a partly sectional view of another embodiment of the discharge end of the shaft.

The embodiment shown in FIG. 7 has a discharge end 710 with a centering bar 720 whose centering head is of a spherical configuration or in the form of a segment of a sphere. That centering bar is also biased in the axial direction by means of a spring 722 and serves for centering a downstream-disposed loop removal means 740 such as for example a smoking rail insofar as it is pressed thereagainst and engages into the central bore 742 provided therein. By virtue of its ball joint this embodiment means that the loop removal means 740 can be inclined with respect to the shaft 700, that is to say it does not have to be in coaxially aligned relationship.

What is claimed is:

1. A transport apparatus for transporting articles hanging on loops, comprising:
    a shaft comprising a first axial portion having an axially extending screw on an outer surface of the shaft,
    a drive operatively connected to the shaft; and
    rollers extending axially and supporting the shaft first axial portion, with an axial length of an outside periphery of the screw resting on the rollers;
    wherein the drive applies a drive moment to an outside periphery of the first axial portion screw and the rollers support the shaft first axial portion on the outside periphery of the screw,
    wherein the rollers are positioned to provide a first axially extending gap beneath the shaft first axial portion and the loops associated with the hanging articles extending around the shaft and through the first axially extending gap to a position beneath the rollers for passage of the loops along the first axially extending gap.

2. The transport apparatus of claim 1, wherein the drive comprises a drive roller with an external peripheral contact surface for frictional application of the drive moment to the outside periphery of the screw.

3. The transport apparatus of claim 2, wherein the contact surface is rubber.

4. The transport apparatus of claim 1 further comprising a shaft second portion with an overridable positive guide means for the loop, wherein the overridable positive guide means is in the form of a spiral notch around the periphery of the shaft second portion, the spiral notch having flanks which terminate at an obtuse angle with respect to the shaft second portion surface.

5. The transport apparatus of claim 1 further comprising a shaft second portion with an overridable positive guide means for the loop, wherein the overridable positive guide means is in the form of a substantially smooth shaft surface and an inclination of the shaft in a transport direction of the transport apparatus.

6. The transport apparatus of claim 4 further comprising at least one stopper which is reciprocatable in the region of the second portion of the shaft between a first position in which it engages into a transport path of the transport apparatus and a second position in which it clears the transport path.

7. The transport apparatus of claim 1 further comprising a loop guide means comprising two axially extending railing members arranged beneath the shaft first portion and forming a second axially extending gap disposed substantially centrally beneath the axis of the shaft.

8. The transport apparatus of claim 1 further comprising a coaxial rotary bearing element at a beginning feed end of the shaft.

9. The transport apparatus of claim 8, wherein the coaxial rotary bearing element comprises an element for securing against axial relative movement.

10. The transport apparatus of claim 9, wherein the element for securing against axial relative movement is in the form of a ball socket or ball.

11. The transport apparatus of claim 1 further comprising a rotary bearing element at a discharge end of the shaft for connecting the shaft to a loop removal means disposed downstream of the shaft.

12. The transport apparatus of claim 11 wherein the rotary bearing element is formed from an axially displaceable centering bar which is biased by means of a spring in the direction of the loop removal means disposed downstream of the shaft.

13. The transport apparatus of claim 12 wherein the centering bar comprises a centering head in the form of a segment of a sphere.

14. The transport apparatus of claim 1 where the rollers are positioned beneath the shaft first portion.

15. The transport apparatus of claim 1 where the rollers extend axially and are arranged parallel to one another, the first axially extending gap being positioned between the rollers and beneath the shaft first portion, the rollers being spaced radially from the axis of the shaft.

16. The transport apparatus of claim 1 where there are two rollers and each roller extends axially, an axis of the drive and axes of the axially extending rollers are parallel to one another and arranged in a triangle, the shaft first portion being positioned within the triangle and the outside periphery of the screw rests on the two rollers, the rollers being spaced radially from the axis of the shaft.

17. The transport apparatus of claim 16 where the two rollers are laterally spaced from another, the gap extending axially and being positioned between the two rollers.

18. The transport apparatus of claim 16 where interior angles of the triangle arrangement of axes of the drive and the two rollers each being less than 180 degrees.

19. A transport apparatus for transporting articles hanging on loops, comprising:
an axially extending shaft comprising a core having an axially extending screw thereabout;
an axially extending drive member, the drive member operatively engaging the shaft;
two axially extending rollers, the rollers being radially spaced from the axis of the shaft;
axes of the axially extending drive member and the two axially extending rollers being parallel to one another and being arranged in a triangle;
the shaft being positioned within the triangle and an outside periphery of the screw resting on an axial length of the two axially extending rollers, the two axially extending rollers being laterally spaced from another defining an axially extending gap between the two axially extending rollers and beneath the shaft and the loops associated with the hanging articles extending around the shaft and through the axially extending gap to a position beneath the rollers for passage of the loops along the axially extending gap.

* * * * *